United States Patent
Seaton et al.

(10) Patent No.: US 10,765,108 B2
(45) Date of Patent: Sep. 8, 2020

(54) CAMOUFLAGE MATERIAL FOR A HUNTING BLIND

(71) Applicant: RUGGED CROSS HUNTING BLINDS LLC, Tampa, FL (US)

(72) Inventors: Christopher M. Seaton, Tampa, FL (US); Timothy R. Seaton, Tampa, FL (US)

(73) Assignee: RUGGED CROSS HUNTING BLINDS LLC, Tampa, FL (US)

( * ) Notice: Subject to any disclaimer, the term of this patent is extended or adjusted under 35 U.S.C. 154(b) by 399 days.

(21) Appl. No.: 15/444,909

(22) Filed: Feb. 28, 2017

(65) Prior Publication Data

US 2017/0245491 A1    Aug. 31, 2017

Related U.S. Application Data

(60) Provisional application No. 62/301,007, filed on Feb. 29, 2016.

(51) Int. Cl.
*A01M 31/02* (2006.01)
*F41H 3/02* (2006.01)
(Continued)

(52) U.S. Cl.
CPC ......... *A01M 31/025* (2013.01); *E04H 15/001* (2013.01); *E04H 15/008* (2013.01);
(Continued)

(58) Field of Classification Search
CPC ........................................................ F41H 3/02
(Continued)

(56) References Cited

U.S. PATENT DOCUMENTS

| 4,308,882 A | 1/1982 | Pusch |
| 4,425,959 A | 1/1984 | Von Mosshaim |

(Continued)

FOREIGN PATENT DOCUMENTS

WO    WO-2017074394 A1 *   5/2017   ........... C09D 11/101

OTHER PUBLICATIONS

ECHOD Graphics Vinyl Mesh Printing—Vinyl Mesh Banner 37% Air Flow (https://web.archive.org/web/20140117130123/https://www.echodgraphics.com/category1.asp?cid=101&iid=12103) (Year: 2014).*

*Primary Examiner* — David R Dunn
*Assistant Examiner* — Danielle Jackson
(74) *Attorney, Agent, or Firm* — Beusse, Wolter, Sanks & Maire PLLC; Robert L. Wolter

(57) ABSTRACT

Mesh material is presented for a hunting blind with a camouflage pattern printed on a first side and a second side with a color coating. The mesh material is partially transmissive such that a portion of incident radiation from an exterior of the hunting blind is reflected back into the exterior, a portion of incident radiation from an interior of the hunting blind is transmitted through the mesh material to the exterior and an intensity ratio of the reflected portion to the transmitted portion during daylight conditions is above a threshold value such that the exterior of the hunting blind is visible from the interior and the interior of the hunting blind is not visible from an exterior of the hunting blind. A hunting blind is also provided that includes a frame including frame members and panels of the mesh material attached to the frame members.

10 Claims, 8 Drawing Sheets

(51) Int. Cl.
  *E04H 15/00* (2006.01)
  *E04H 15/54* (2006.01)
  *E04H 15/34* (2006.01)

(52) U.S. Cl.
  CPC ............. *E04H 15/34* (2013.01); *E04H 15/54* (2013.01); *F41H 3/02* (2013.01)

(58) Field of Classification Search
  USPC ........................................................ 428/919
  See application file for complete search history.

(56) References Cited

U.S. PATENT DOCUMENTS

| | | | | |
|---|---|---|---|---|
| 5,261,978 | A * | 11/1993 | Reynolds | F41H 3/02 |
| | | | | 156/223 |
| 5,842,495 | A | 12/1998 | Egnew | |
| 6,004,649 | A * | 12/1999 | Nagata | B44D 2/00 |
| | | | | 428/107 |
| 6,009,673 | A * | 1/2000 | Adams | E04H 1/1205 |
| | | | | 135/901 |
| 6,942,065 | B1 * | 9/2005 | Price | A01M 31/025 |
| | | | | 135/901 |
| 7,040,333 | B1 | 5/2006 | Ransom | |
| 7,427,433 | B2 * | 9/2008 | Li | B44F 1/02 |
| | | | | 428/131 |
| 7,565,909 | B2 * | 7/2009 | Reis | E04H 15/001 |
| | | | | 135/115 |
| 7,568,492 | B1 | 8/2009 | Helmer | |
| 9,163,451 | B1 * | 10/2015 | Curry | E06B 9/24 |
| 2003/0096546 | A1 * | 5/2003 | Strength | B32B 5/02 |
| | | | | 442/131 |
| 2007/0006909 | A1 * | 1/2007 | Lewis | A01M 31/025 |
| | | | | 135/115 |
| 2008/0083443 | A1 * | 4/2008 | Eastman, II | E04H 15/001 |
| | | | | 135/121 |
| 2009/0277094 | A1 * | 11/2009 | Ward | A01M 31/025 |
| | | | | 49/413 |
| 2010/0031423 | A1 * | 2/2010 | Cincotti | A42B 5/00 |
| | | | | 2/207 |
| 2010/0232029 | A1 * | 9/2010 | Lewis, Jr. | A01M 31/025 |
| | | | | 359/629 |
| 2012/0128890 | A1 * | 5/2012 | Mirchev | C09D 11/101 |
| | | | | 427/493 |

* cited by examiner

CAMOUFLAGE MATERIAL FOR A HUNTING BLIND

CROSS REFERENCE TO RELATED APPLICATIONS

This application is a Non-Provisional Patent Application that claims the benefit to U.S. Provisional Patent Application No. 62/301,007 filed on Feb. 29, 2016, and incorporated by reference herein in its entirety.

BACKGROUND OF THE INVENTION

Hunting blinds are used to conceal a hunter's location as game approaches. Although conventional hunting blinds have been developed, they have several drawbacks. For example, conventional hunting blinds have limited structural integrity and thus are not capable of withstanding elements of the outdoors. Additionally, conventional hunting blinds feature structures with closed panels that provide limited ventilation. Thus, these hunting blinds have limited use in high humidity hunting climates.

BRIEF DESCRIPTION OF THE INVENTION

In one embodiment of the invention, mesh material of interwoven fabric is provided for a hunting blind including a camouflage pattern printed on a first side and a second side with a dark color coating, the second side opposite to the first side. The mesh material is partially transmissive such that a portion of incident radiation from an exterior of the hunting blind is reflected off the camouflage pattern on the first side back into the exterior, a portion of incident radiation from an interior of the hunting blind is transmitted through the mesh material to the exterior and wherein a ratio of an intensity of the reflected portion to an intensity of the transmitted portion during daylight conditions is above a threshold value such that the exterior of the hunting blind is visible through the mesh material from the interior of the hunting blind and the interior of the hunting blind is not visible through the mesh material from the exterior of the hunting blind during daylight conditions.

In another embodiment of the invention, a hunting blind is provided including a frame with a plurality of frame members and panels of mesh material attached to the frame members that cover an area between the frame members to define an interior of the hunting blind.

In another embodiment of the invention, a mesh material is provided that is capable of being secured to a frame of a hunting blind. The mesh material includes a camouflage pattern printed on a first side of the mesh material that faces an exterior of the hunting blind and a single color coating on a second side of the mesh material that faces an interior of the hunting blind.

DETAILED DESCRIPTION OF THE INVENTION

Figure 1A:
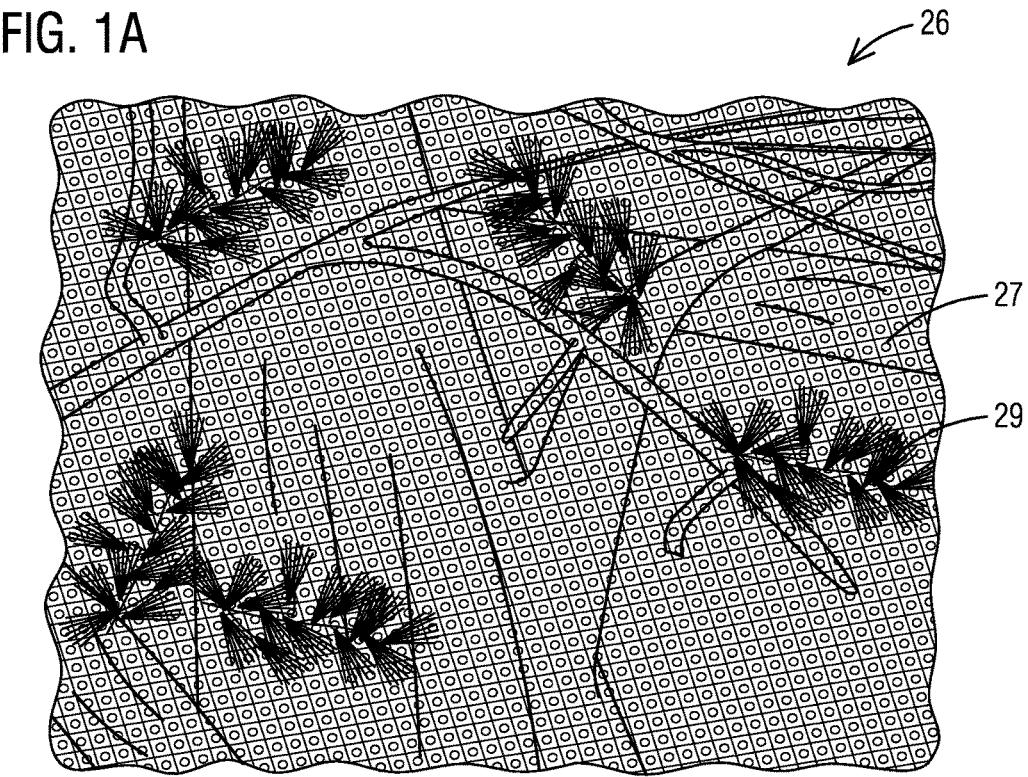
FIG. 1A is a perspective view of a first side of mesh material in accordance with aspects of embodiments of the invention.

A more particular description of the invention briefly described above will be rendered by reference to specific embodiments thereof that are illustrated in the appended drawings. Understanding that these drawings depict only typical embodiments of the invention and are not therefore to be considered to be limiting of its scope, the invention will be described and explained.

The inventors of the present invention designed an improved hunting blind that overcomes the above noted drawbacks of conventional hunting blinds. In one example, the inventors of the present invention recognized that conventional hunting blinds have limited structural integrity and thus are not capable of withstanding elements of the outdoors. To overcome this noted drawback, the inventors of the present invention designed a hunting blind with a frame that features interconnected extruded aluminum members that provide structural integrity to withstand elements of the outdoors. While some embodiments of the present invention disclose a hunting blind with a frame including rigid interconnected members, the present invention is not limited to this arrangement and also features a hunting blind with a frame including flexible frame members. In another example, the inventors of the present invention recognized that conventional hunting blinds are formed with closed panels that provide limited ventilation and thus have limited use in high humidity hunting climates. To overcome this noted drawback, the inventors of the present invention designed a hunting blind with panels of mesh material that simultaneously provide ventilation to an interior of the hunting blind and camouflage the interior of the hunting blind.

In selecting an appropriate mesh material to form the improved hunting blind, the inventors of the present invention recognized that conventional mesh material used in connection with hunting has notable drawbacks. For example, the inventors recognized that such conventional mesh material easily catches and tears on branches as an individual wearing the mesh material moves through dense woods. In another example, the inventors recognized that such conventional mesh material is relatively light and transparent and thus would not effectively camouflage the interior of the hunting blind. To overcome these noted drawbacks, the inventors of the present invention selected a mesh material that is heavier and/or more durable than the conventional mesh material used in connection with hunting. This mesh material advantageously provides an effective camouflage to the interior of the hunting blind and is more durable thereby extending a projected lifetime of the hunting blind.

Although some embodiments of the present invention discuss the use of mesh material in the context of hunting blinds, the present invention is not limited to this context and includes all uses of camouflage material in the context of hunting. In other embodiments, the camouflage material (e.g. mesh material 26) can be used to form a ground blind or stake out blind that is mounted in the ground to conceal an individual positioned behind the blind. In still other embodiments, the camouflage material can be used to form windows or tree sand skirts. For purposes of this invention, "camouflage material" means material that is used to cover people, equipment and/or installations, such as the hunting blinds discussed herein, to make them blend in with their surroundings.

Figure 1B:
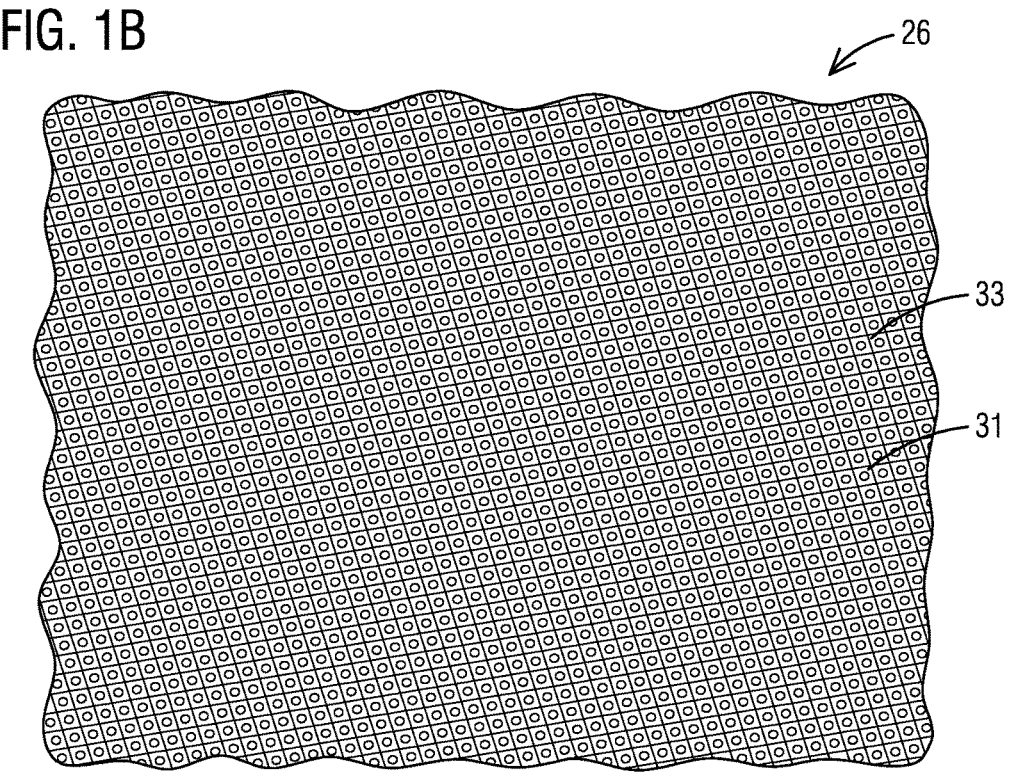
FIG. 1B is a perspective view of a second side of mesh material of FIG. 1A.

FIG. 1A is a perspective view of a first side 27 of mesh material 26 in accordance with aspects of embodiments of the invention. FIG. 1B is a perspective view of a second side 31 of mesh material 26 of FIG. 1A that is opposite to the first side 27. Panels of mesh material 26 are used to form an improved hunting blind, as discussed below. As shown in FIG. 1A, the first side 27 of the mesh material 26 features a camouflage pattern 29. In an example embodiment, the camouflage pattern 29 is based on an exterior environment where the hunting blind will be positioned.

In an example embodiment, the camouflage pattern 29 is based on a photograph of the exterior environment of the hunting blind, and the camouflage pattern 29 can be printed on the first side 27 using ink. As shown in FIG. 1B, the second side 31 of the mesh material 26 includes a dark color coating, such as dark colored ink 33. However, in other embodiments, any color coating, such as any colored ink can be coated on the second side 31, including white colored coating, blue colored coating, red colored coating, yellow colored coating, green colored coating, orange colored coating and purple colored coating. In some embodiments, an exterior surface of the second side 31 is coated with the dark colored ink 33. In other embodiments, dark colored mesh material 26 is used and thus the second side 31 does not need to be coated with dark colored ink 33. In this embodiment, only the first side 27 of the mesh material 26 needs to be printed with the camouflage pattern 29. In some embodiments, for purposes of this description, "dark colored ink" means a colored ink that absorbs a substantial portion of incident visible light. In an example embodiment, the dark colored ink absorbs 50% or more of incident visible light. In another example embodiment, the dark colored ink absorbs 80% or more of incident visible light, for example. In other embodiments, for purposes of this description, "dark colored ink" means one or more of black colored ink, brown colored ink, grey colored ink, dark black colored ink, dark brown colored ink, dark grey colored ink, light brown colored ink, light grey colored ink, dark red colored ink, dark green colored ink, dark blue colored ink, dark purple colored ink, dark orange colored ink, dark yellow colored ink, or any combination thereof. In still other embodiments, "dark colored ink" means one or more color coded inks provided by ink manufacturers, as discussed below.

Figure 1C:
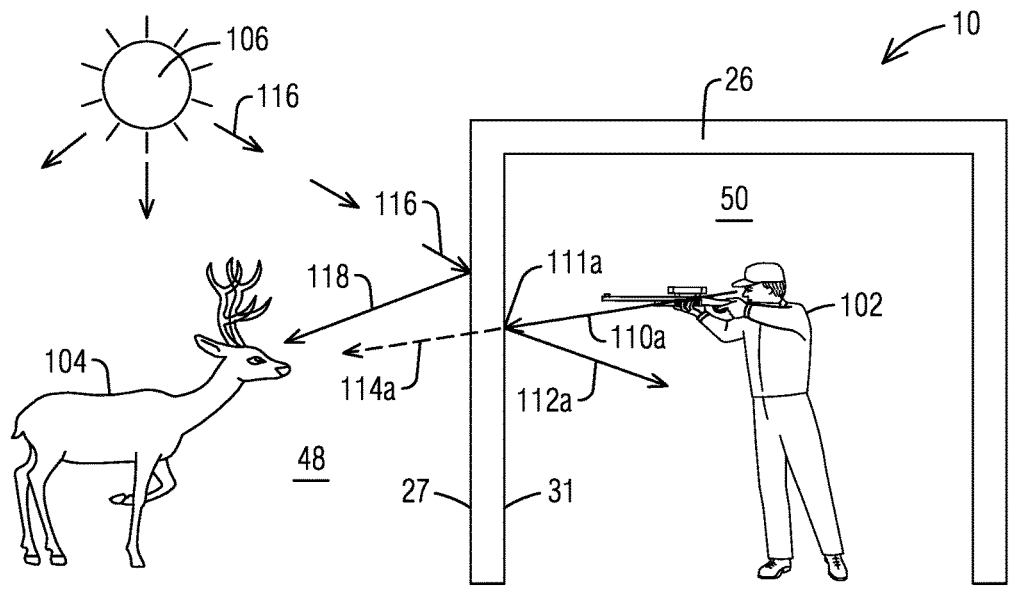
FIG. 1C is a side cutaway view of the hunting blind of FIG. 2 depicting a ray diagram of light incident on the hunting blind from an interior of the hunting blind.
Figure 2:
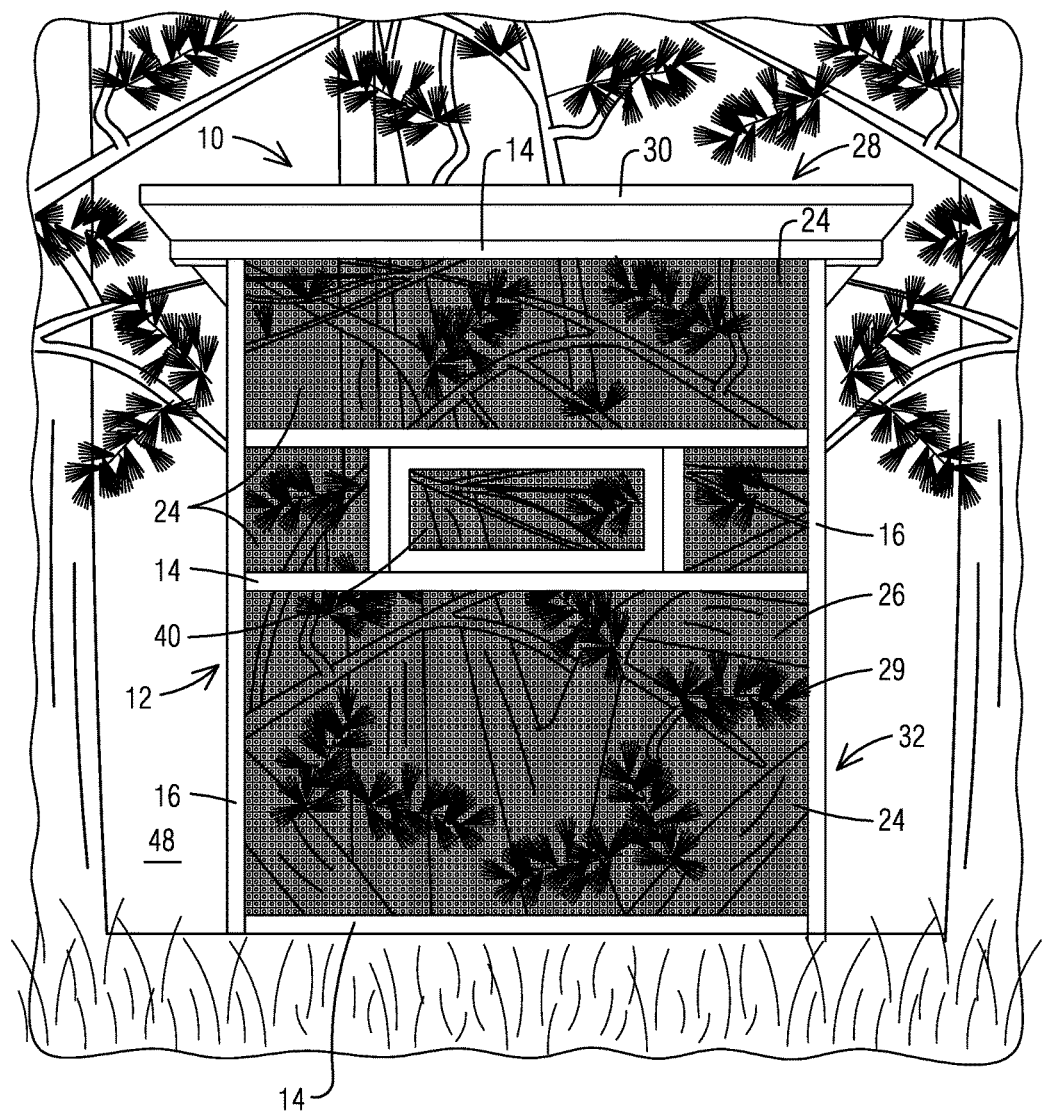
FIG. 2 is a side view of a hunting blind in accordance with aspects of embodiments of the invention.

In an example embodiment, panels of the mesh material 26 are oriented on the hunting blind such that the first side 27 is directed toward the exterior of the hunting blind and the second side 31 is directed toward the interior of the hunting blind. During daylight conditions, the exterior of the hunting blind is visible from the interior of the hunting blind, but the interior of the hunting blind is not visible from the exterior of the hunting blind. FIG. 1C is a side cutaway view of the hunting blind 10 of FIG. 2 depicting a ray diagram of visible light incident on the hunting blind 10 from an interior 50 of the hunting blind 10. A hunter 102 is positioned in the interior 50 of the hunting blind 10 and game 104 (e.g. deer) is positioned in an exterior 48 of the hunting blind 10. In some embodiments, the hunting blind 10 is used during daylight conditions, when the sun 106 emits radiation 116. The hunter 102, game 104 and sun 106 are not part of the hunting blind 10. As depicted in FIG. 1C, incident radiation 110a from the hunter 102 is incident on the second side 31 of the mesh material 26. A first portion 111a of the incident radiation 110a is absorbed by the coating of the second side 31. In some embodiments, the dark colored ink of the second side 31 is selected to maximize the absorbed portion 111a of the incident radiation 110a. In other embodiments, an intensity ratio of the absorbed portion 111a to the incident radiation 110a for the second side 31 is greater than an intensity ratio of the absorbed portion 111b to the incident radiation 110b for the first side 27. A second portion 112a of the incident radiation 110a is reflected off the second side 31 back into the hunting blind interior 50. A third portion 114a of the incident radiation 110a is transmitted through the mesh material 26 to the game 104. As further depicted in FIG. 1C, radiation 116 from the sun 106 is incident on the camouflage pattern 29 on the first side 27 of the mesh material 26. A portion 118 of the incident radiation 116 is reflected off the camouflage pattern 29 to the game 104. In some embodiments, an intensity of the reflected portion 118 of light from the camouflage pattern 29 is much greater than an intensity of the transmitted portion 114a of light from the interior 50 (e.g. hunter 102). Since the intensity of the light from the camouflage pattern 29 is much greater than the intensity of the light from the interior 50 (e.g. hunter 102), the interior 50 of the hunting blind 10 is not visible from the exterior 48 of the hunting blind 10. For purposes of this description, "much greater" is based on the threshold value of the intensity ratio discussed below. Instead, the camouflage pattern 29 is visible from the exterior 48 and conceals the interior 50 of the hunting blind 10. In an example embodiment, the radiation discussed above is in one or more regions of the visible portion (e.g. 400-700 nm) of the optical spectrum that overlaps with a detection spectrum of game 104. In other embodiments, the radiation discussed above is in a detection spectrum of game 104, including one or more regions of the visible portion and ultra-violet (UV) portions of the spectrum. In one embodiment, the camouflage pattern 29 on the first side 27 and colored coating on the second side 31 are selected such that a ratio of the intensity of the reflected portion 118 to the intensity of the transmitted portion 114a during daylight conditions is more than a threshold value such that the interior 50 of the hunting blind 10 is not visible from the exterior 48 of the hunting blind 10. In one embodiment, the threshold value is 1. In other embodiments, the threshold value is 2. In still other embodiments, the threshold value is 5. In still other embodiments, the threshold value is 10. In still other embodiments, the threshold value is 100.

Figure 1D:
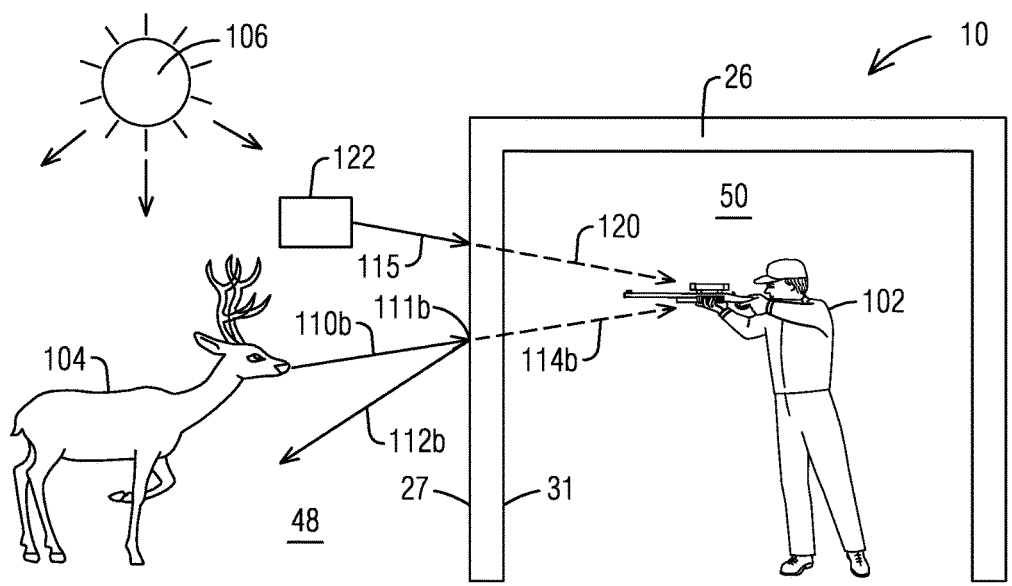
FIG. 1D is a side cutaway view of the hunting blind of FIG. 2 depicting a ray diagram of light incident on the hunting blind from an exterior of the hunting blind.

FIG. 1D is a side cutaway view of the hunting blind 10 of FIG. 2 depicting a ray diagram of visible light incident on the hunting blind 10 from the exterior 48 of the hunting blind 10. As depicted in FIG. 1D, incident radiation 110b from the game 104 is incident on the first side 27 of the mesh material 26. A first portion 111b of the incident radiation 110b is absorbed by the camouflage pattern 29 on the first side 27. A second portion 112b of the incident radiation 110b is reflected off the first side 27 back to the exterior 48. A third portion 114b of the incident radiation 110b is transmitted through the mesh material 26 to the interior 50 (e.g. hunter 102). As further depicted in FIG. 1D, radiation 115 from an object 122 (e.g. tree) in the exterior 48 is incident on the camouflage pattern 29 on the first side 27 of the mesh material 26. A portion 120 of the incident radiation 115 is transmitted through the mesh material 26 to the interior 50 (e.g. hunter 102). In some embodiments, an intensity of the transmitted portion 114b of light from the game 104 is approximately equal to an intensity of the transmitted portion 120 from the object 122. For purposes of this description, "approximately equal" is based on a range of intensity ratio, as discussed below. Since the intensity of the light from the game 104 is approximately equal to the intensity of the light from the object 122, the exterior 48 of the hunting blind 10 is visible from the interior 50 of the hunting blind 10. In an example embodiment, distinct forms (e.g. game 104, object 122, etc.) in the exterior 48 are visibly distinguishable, as viewed from the interior 50 of the hunting blind 10. In this embodiment, the hunter 102 can visibly distinguish the game 104 from other parts of the exterior 48 (e.g. object 122) since the intensity of the light from the game 104 is approximately equal to the intensity of light from other parts of the exterior 48 (e.g. object 122). In one embodiment, the camouflage pattern 29 on the first side 27 and colored coating on the second side 31 are selected such that a ratio of the intensity of the transmitted portion 114b to the intensity of the transmitted portion 120 during daylight conditions is approximately equal to 1. In other embodiments, the ratio is in a range from 0.9-1.1. In still other embodiments, the ratio is in a range from 0.8-1.2. In still other embodiments, the ratio is in a range from 0.5-2. In still other embodiments, the ratio is in a range from 0.2-5. In still other embodiments, the ratio is in a range from 0.1-10.

Different types of ink and printing techniques can be used to print the camouflage pattern 29 on the first side 27 and the dark colored ink 33 on the second side 31. Each ink includes a colorant (e.g. dye or pigment) and a carrier liquid (e.g. solvent). A defining quality of each ink is the process used to adhere the colorant to the mesh material 26.

In some embodiments, a solvent based ink is used to print the camouflage pattern 29 on the first side 27 and the dark colored ink 33 on the second side 31. Solvent ink refers to an oil-based solution that holds a colorant (e.g. pigment), and is advantageously fade-resistant, waterproof and resistant to abrasion. During a printing process of the solvent-based ink, the solvent ink (i.e. colorant and solvent) is printed on the mesh material 26, after which the solvent evaporates or is flashed off with heaters on the printer, leaving the colorant behind. In an embodiment, the solvent based ink resists fading for five to seven years. In one embodiment, a region where the printing is performed is vented to exhaust volatile organic compounds (VOC) that are present during the solvent printing process.

In other embodiments, an eco-solvent based ink is used to print the camouflage pattern 29 on the first side 27 and the dark colored ink 33 on the second side 31. In an example embodiment, eco solvent ink is used that is sold under the ECO SOL MAX brand name. Eco-solvent ink is made using ether extracts taken from refined mineral oil. The eco-solvent ink printing process is similar to solvent ink printing, with the exception that eco-solvent ink takes longer to dry and venting is not required since VOC are not present during the printing process. The eco-solvent ink can be removed by alcohol and glass cleaner and accordingly, the durability of eco-solvent ink is reduced as compared to solvent ink. In some embodiments, eco-solvent ink resists fading for two to three years, which is reduced from the period of solvent ink. In an embodiment, manufacturers offer eco-solvent inks in various color sets. In an example embodiment, manufacturers offer color coded inks using letters, including cyan (C), magenta (M), yellow (Y), black (K), light cyan (LC), light magenta (LM), light black (LK), white, silver and metallic. In an example embodiment, one or more of the black (K), light black (LK), silver and metallic colored inks can be used to print the dark colored ink 33 on the second side 31.

In other embodiments, a latex based ink is used to print the camouflage pattern 29 on the first side 27 and the dark colored ink 33 on the second side 31. Latex ink is a pigmented, water-based ink that uses an aqueous-dispersed polymer. As with the eco-solvent based ink, there is no VOC and accordingly, no venting is required during the latex ink printing process. In one embodiment, the camouflage pattern 29 on the first side 27 and dark colored ink 33 on the second side 31 comes out of the printer completely cured. In some embodiments, radiant heaters with airflow are incorporated into the printer to evaporate the latex ink liquid, which causes the latex polymer particles to coalesce, forming a polymer layer that adheres to the mesh material 26 and encapsulates the pigment. In other embodiments, the printer uses ceramic radiated plates for a constant and even heat source.

In other embodiments, an ultra-violet (UV) based ink is used to print the camouflage pattern 29 on the first side 27 and the dark colored ink 33 on the second side 31. UV based ink includes oligomer and monomer acrylate resins and photo initiators. During the printing process, after the ink is applied to the mesh material 26, the ink is exposed to UV radiation such that free radicals are released that cause the polymerization of the compound to harden to a dry ink film. The pigment is then encapsulated within this film. In some embodiments, the UV radiation is applied with a light emitting diode (LED) source (i.e. low-heat, long-life) or a mercury arc lamp (i.e. higher heat, shorter life). Unlike the solvent based ink, the UV based ink does not evaporate and instead is "cured" when the UV light system of the printer passes overhead. Due to a low viscosity of the UV based inks and since UV based inks do not penetrate the mesh material 26, the camouflage pattern 29 on the first side 27 and dark colored ink 33 on the second side 31 can be advantageously printed using a reduced volume of UV based ink, as compared to solvent based ink.

In some embodiments, the mesh material 26 is a mesh banner material, for example. In one embodiment, the mesh material 26 is made of polyester. In an example embodiment, the mesh material 26 is made of polyester material that is coated with a PVC (polyvinyl chloride) film or backing. In an example embodiment, the mesh material 26 is a vinyl coated polyester made of polyester scrim, a bonding or adhesive agent and an exterior PVC coating or backing. The scrim supports the coating and provides tensile strength, elongation, tear strength and dimensional stability of the resulting fabric. In some embodiments, vinyl-coated polyester is manufactured in large panels by heat-sealing an over-lap seam with either a radio-frequency welder or a hot-air sealer. In other embodiments, the mesh material 26 is made from a textile or cloth material that is a flexible material and includes a network of natural or artificial fibers (e.g. yarn or thread). In an example embodiment, the mesh material 26 is formed by yarn that is produced by spinning raw fibers of wool, flax, cotton or other material producing long strands. In other embodiments, the mesh material 26 is formed by textiles that are formed by weaving, knitting, crocheting, knotting or felting. In still other embodiments, the mesh material 26 is formed using synthetic textile material, including one or more of polyester, aramid fiber, acrylic fiber, nylon, spandex, olefin fiber, ingeo, lurex and carbon fiber. In another embodiment, the mesh material 26 features a PVC (polyvinyl chloride) backing. The PVC backing creates an air-tight print surface to prevent ink spraying through the mesh material 26 and helps to feed the mesh material 26 through the printer during the printing process. The PVC backing is removed from the mesh material after printing, such as by peeling the PVC backing off the polyester material. In another example embodiment, the mesh material 26 has a weight density of approximately 8 ounce (oz) per square yard ($yd^2$). In another example embodiment, the mesh material 26 is a coated polyester scrim mesh banner material. In an example embodiment, the mesh material 26 allows airflow in a range of 30-40%, such as 37%, for example, where airflow is defined as a ratio of a velocity of outgoing air from the mesh material 26 to a velocity of incident air onto the mesh material 26. In another example embodiment, the mesh material 26 has a tensile strength of approximately 160×160 pounds/inch and/or a tear strength of approximately 34×34 pounds/inch. In another example embodiment, the mesh material 26 has a low temperature crack threshold of approximately −22 degrees Fahrenheit (F.). In another example embodiment, the mesh material 26 is fungus resistant and flame resistant, NFPA701, title 19, CSFM, ASTM E84.

Figure 3A:
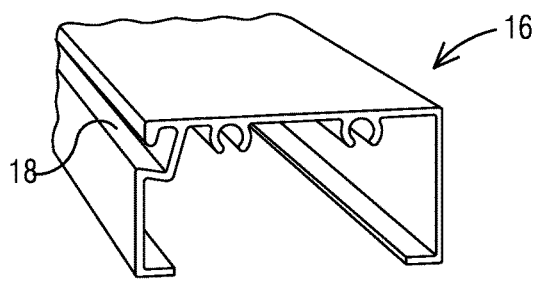
FIG. 3A is a perspective view of an open back extruded aluminum member used to form a frame of the hunting blind of FIG. 2.
Figure 3B:
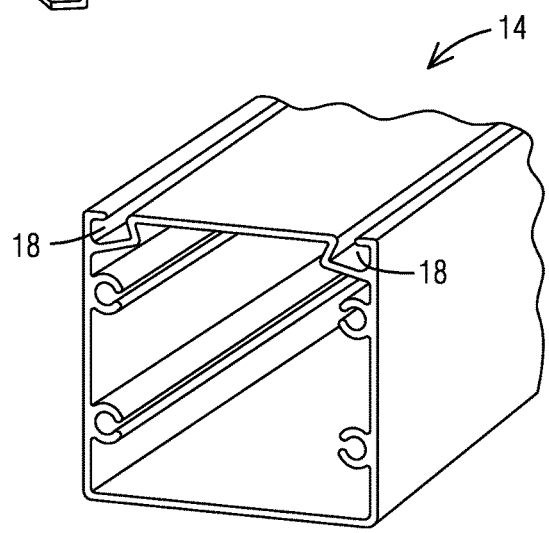
FIG. 3B is a perspective view of a hollow extruded aluminum member used to form the frame of the hunting blind of FIG. 2.

FIG. 2 is a side view of a first side 32 of a hunting blind 10 in accordance with aspects of embodiments of the invention. The hunting blind 10 includes a frame 12 with one or more frame members, such as aluminum extruded members 14, 16 that are interconnected together. In an example embodiment, the aluminum extruded member 14 is a 2"×2" closed hollow member and the aluminum extruded member 16 is a 1"×2" open back member. FIG. 3A is a perspective view of an open back extruded aluminum member 16 that forms the frame 12 of the hunting blind 10 of FIG. 2. As shown in FIG. 3A, the extruded aluminum member 16 includes one spline groove 18 to receive a spline, as discussed below. FIG. 3B is a perspective view of a hollow extruded aluminum member 14 that forms the frame 12 of the hunting blind 10 of FIG. 2. As shown in FIG. 3B, the extruded aluminum member 14 includes a pair of spline grooves 18 to receive respective splines, as discussed below. In an example embodiment, 3" bronze sheet screws are internally screwed to attach interconnecting extruded members 14, 16. In an example embodiment, 10¾" text screws are used to attach clips in interconnected areas of the extruded members 14, 16 that are not internally screwed together.

Figure 4:
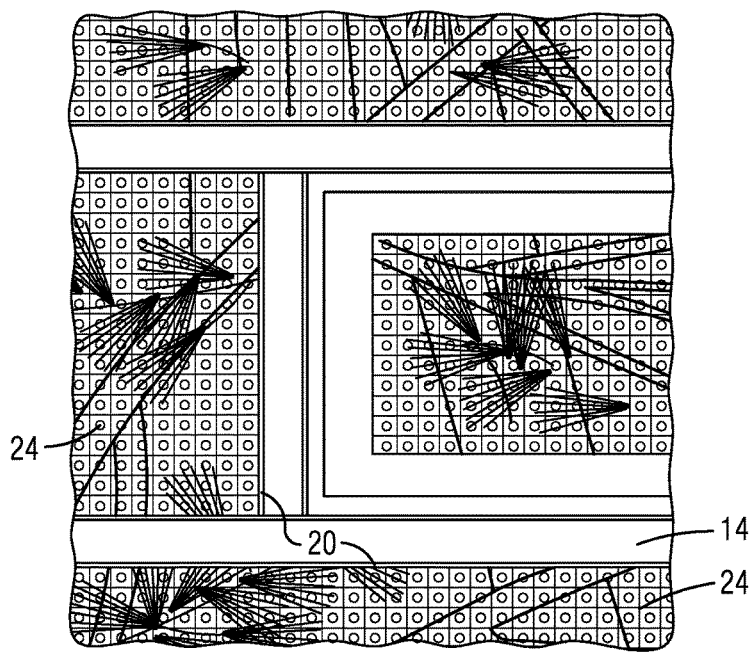
FIG. 4 is a view of an interconnection between extruded members and mesh material in the hunting blind of FIG. 2.

The hunting blind 10 also includes panels 24 of the mesh material 26 that are secured between aluminum extruded members 14, 16. In some embodiments, the panels 24 of the mesh material 26 are attached to the members 14, 16 of the frame 12 to cover an area between the members 14, 16 and define an interior of the hunting blind 10. In an example embodiment, the camouflage pattern 29 on the mesh material 26 is based on the exterior 48 of the hunting blind 10. FIG. 4 is a view of an interconnection between extruded members 14, 16 and panels 24 of mesh material 26 in the hunting blind 10 of FIG. 2. As shown in FIG. 4, a spline 20 is provided along a perimeter of the panel 24 and the spline 20 is positioned within one of the spline grooves 18 of the extruded member 14, to secure the panel 24 along the length of the extruded member 14. In an example embodiment, the spline 20 is a rubber spline. In some embodiments, the spline 20 secures a first side of the panel 24 within a spline groove 18 of a first extruded member 14, 16 and the spline 20 further secures a second side of the panel 24 within a spline groove 18 of a second extruded member 14, 16, where the first and second extruded members 14, 16 are interconnected to form the frame 12. In further embodiments, the spline 20 secures a third side of the panel 24 within a spline groove 18 of a third extruded member 14, 16 and the spline 20 secures a fourth side of the panel 24 within a spline groove 18 of a fourth extruded member 14, 16, where the first, second, third and fourth extruded members 14, 16 are interconnected to form the frame 12. In other embodiments, a respective spline 20 is used to secure each side of the panel 24 within a respective spline groove of the extruded member.

Figure 5:
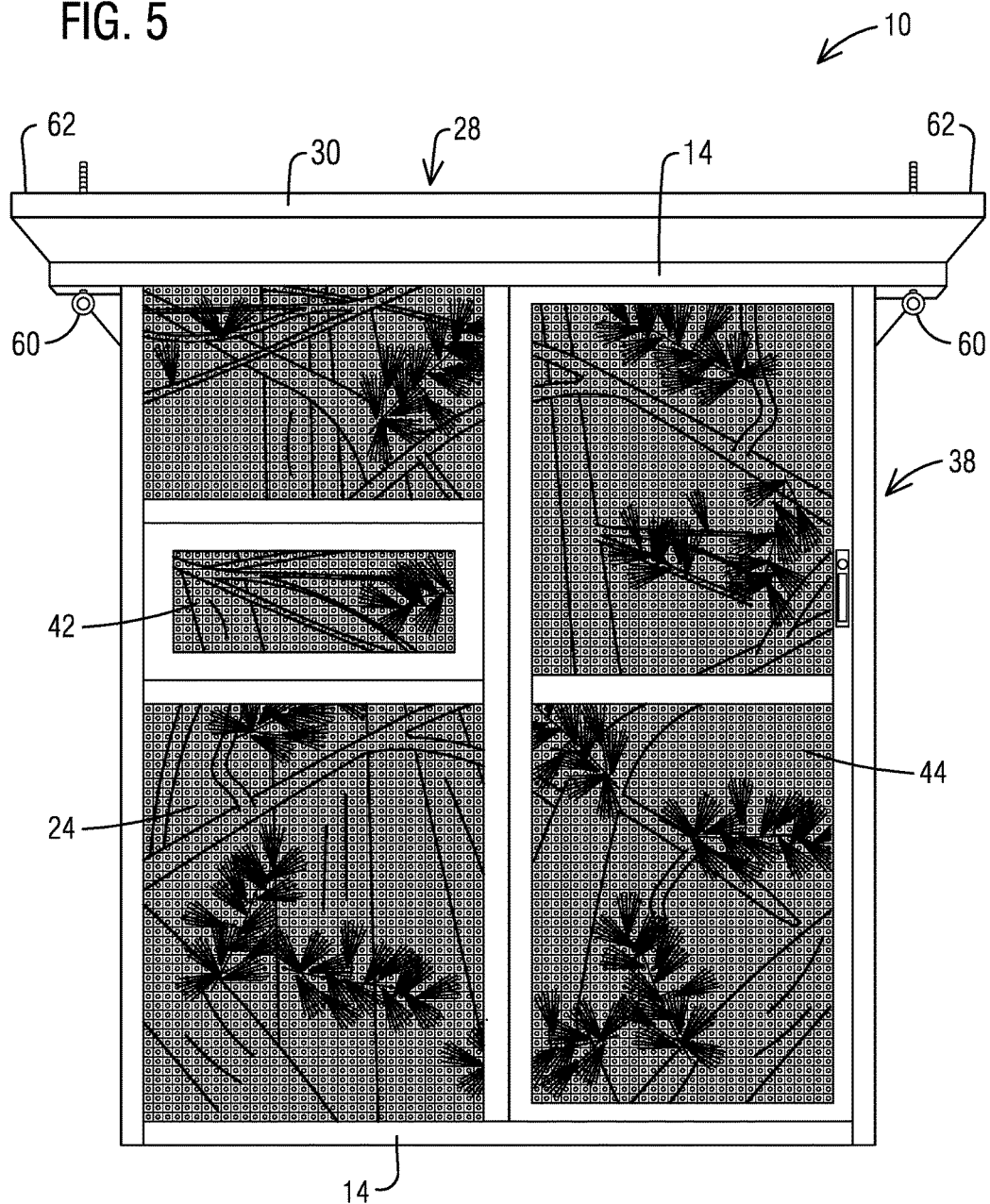
FIG. 5 is a back view of the hunting blind of FIG. 2.

FIG. 5 is a back view of the hunting blind 10 of FIG. 2. A roof 28 of the hunting blind 10 includes roof panels 30. In an example embodiment, the roof panels 30 have a high-density polystyrene core and are laminated on both sides by stucco textured aluminum. In an example embodiment, the roof panels 30 are 2" Elite® aluminum panels. Anchor bolts 60 are secured through an extruded member 14 and the roof panels 30 at each corner 62 of the hunting blind 10. In an example embodiment, the anchor bolts 60 include a stainless steel eyebolt that is attached with a pair of washers and a hex nut. In an example embodiment, 3" bronze sheet screws (not shown) with neoprene washers are used to attach the roof panels 30 to the extruded members 14 that extend around a perimeter of an undersurface of the roof panels 30.

Figure 6:
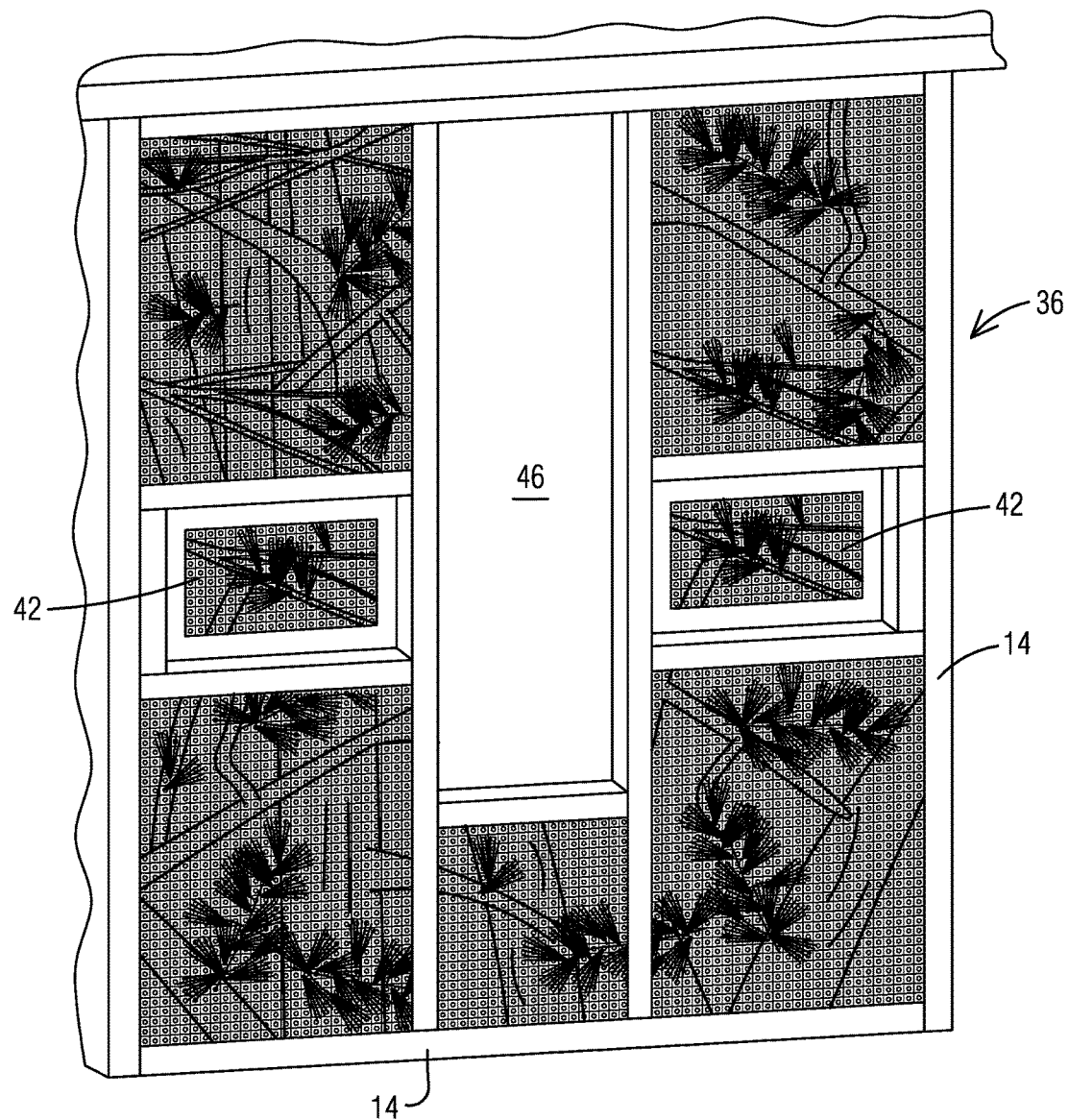
FIG. 6 is a perspective front view of the hunting blind of FIG. 2 with an open bow window.
Figure 7:
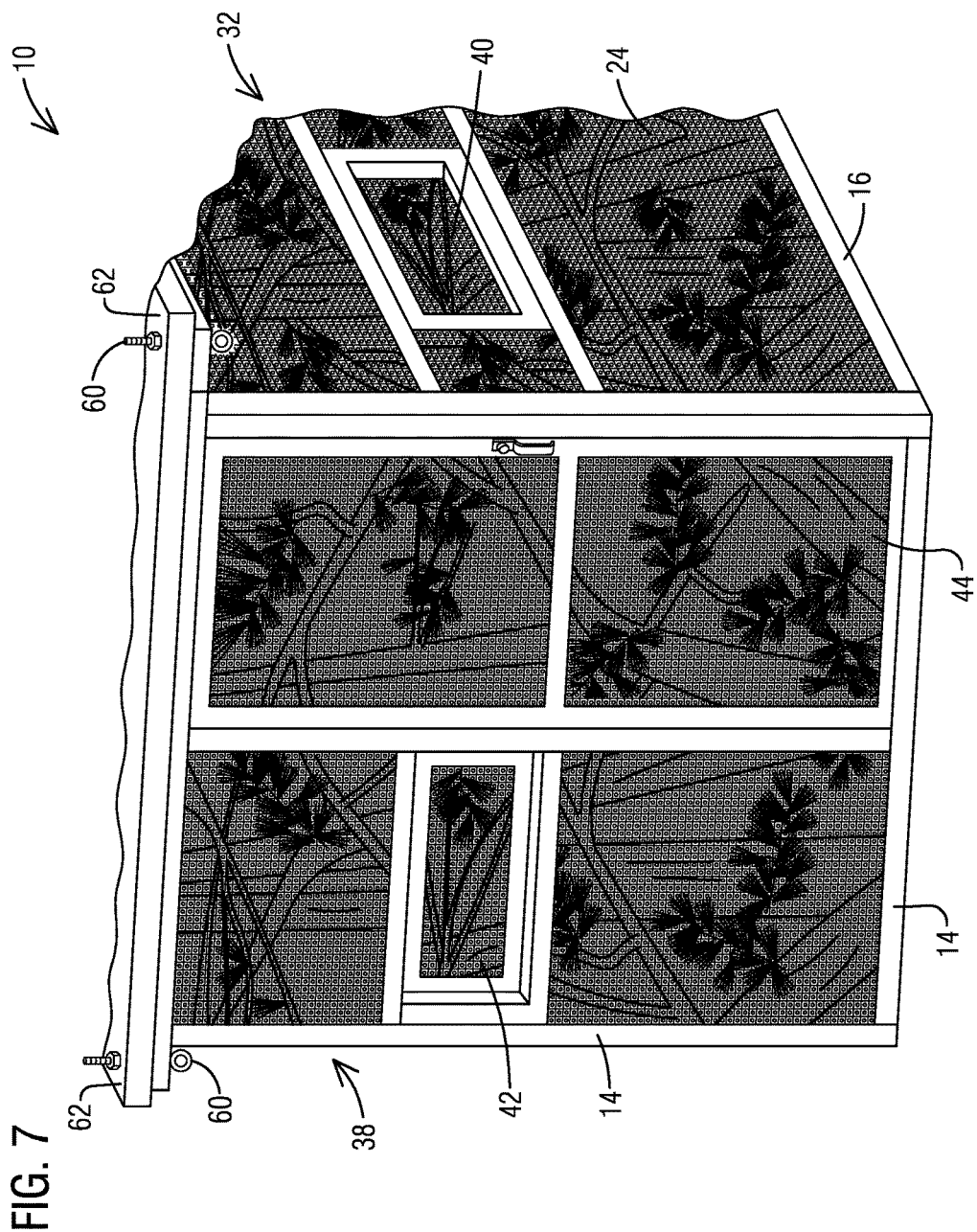
FIG. 7 is a perspective back view of the hunting blind of FIG. 2.

The hunting blind 10 includes one or more doors and windows. Each door and window includes one or more panels 24 of mesh material 26 that forms an interior of the door or window and is interconnected to extruded members 14, 16 that form the frame of each door and window. As shown in FIG. 2, the first side 32 of the hunting blind 10 includes a window 40 that can be opened (inward to the interior of the blind 10) to provide a shooting position upon the approach of prey from the first side 32. Additionally, as shown in FIG. 5, a back side 38 of the hunting blind 10 includes a window 42 that provides a shooting position upon the approach of prey from the back side 38. FIG. 6 is a perspective front view of a front side 36 of the hunting blind 10 of FIG. 2 with an open bow window 46 that provides an arching position upon the approach of prey from the front side 36. In an example embodiment, dimensions of the windows 40, 42 are 26" (width)×12" (height), for example. In an example embodiment, dimensions of the bow window 46 is 13" (width)×46" (height), for example. Additionally, as shown in FIG. 5, a back side 38 of the hunting blind 10 includes a door 44 that can open (either inward or outward) for entry to the interior of the hunting blind 10. In an example embodiment, dimensions of the door 44 are 30" (width)×66" (height), for example. In an example embodiment, the windows 40, 42, 46 or door 44 can be customized, in terms of length or width. In an example embodiment, the door 44 can be customized to have a width up to 48". In an example embodiment, the windows 40, 42, 46 and door 44 have a frame made of bronze extruded aluminum members. The above numerical dimensions of the windows 40, 42, 46 and door 44 are merely exemplary and the dimensions of the windows 40, 42, 46 and door 44 are not limited to any specific dimension. FIG. 7 depicts another view of the hunting blind 10, including the windows 40, 42 and door 44.

In an example embodiment of the frame 12, the extruded members 14 are 2"×2". In another example embodiment, a height of the frame 12 at the front side 36 is approximately 6' and a width of the frame 12 at the front side 36 and back side 38 is approximately 5'4". As previously discussed, panels 24 of mesh material 26 are secured within the frames of each window 42, 46, to form the hunting blind 10. These numerical dimensions are merely exemplary and the frame 12 is not limited to these numerical dimensions.

In an example embodiment of the frame 12, the extruded members 14 are 2"×2" and the extruded members 16 are 1"×2". In another example embodiment, a height of the frame 12 at the sides 32, 34 varies from a first height (e.g. 5'10") to a second height (e.g. 6') that is greater than the first height, to provide a pitch in the roof 28 for rainwater runoff. Additionally, a width of the frame 12 at the sides 32, 34 is approximately 5'. As previously discussed, panels 24 of mesh material 26 are secured within the frames of each window 40, to form the hunting blind 10. These numerical dimensions re merely exemplary and the frame 12 is not limited to these numerical dimensions.

Figure 8:
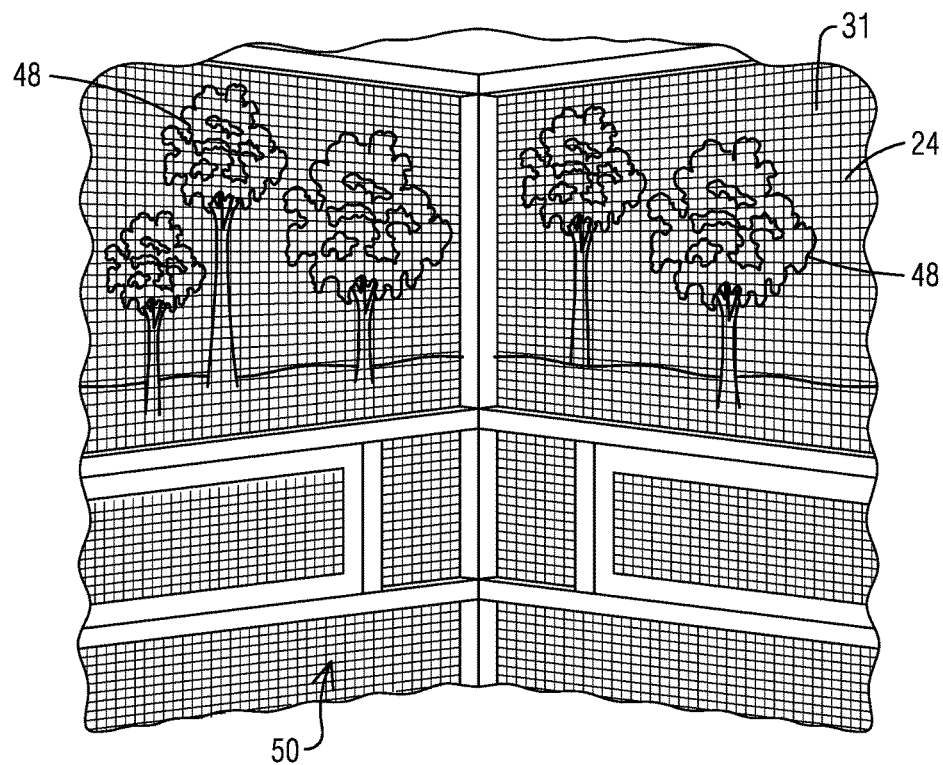
FIG. 8 is a view of an exterior of the hunting blind through mesh material from an interior of the hunting blind of FIG. 2.

FIG. 8 is a view of the exterior 48 of the hunting blind 10 through panels 24 of mesh material 26 from an interior 50 of the hunting blind 10 of FIG. 2. The second side 31 of the mesh material 26 faces the interior 50 of the hunting blind 10. The mesh material 26 is partially transmissive such that during daylight conditions, the exterior 48 of the hunting blind 10 is visible from the interior 50 of the hunting blind 10 yet the interior 50 of the hunting blind 10 is not visible from the exterior 48 of the hunting blind 10. As depicted in the view of FIG. 9 since the panels 24 of mesh material 26 are provided on each side of the hunting blind 10, the hunting blind 10 provides a 360 degree view of the exterior 48 through the panels 24 in each side of the hunting blind 10.

Figure 9:
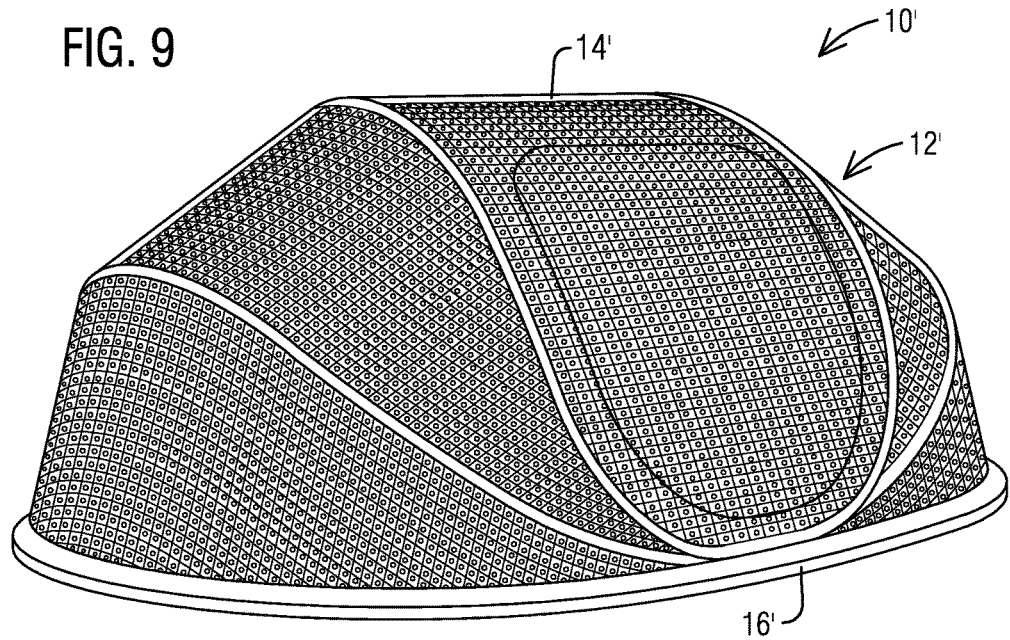
FIG. 9 is a side view of a hunting blind in accordance with aspects of embodiments of the invention.

FIG. 9 is a side view of a hunting blind 10' in accordance with aspects of embodiments of the invention. The hunting blind 10' includes a frame 12' that is formed of interconnected flexible frame members 14', 16'. In an example embodiment, the hunting blind 10' has a structure that is similar to a pop-up tent. As with the hunting blind 10, the hunting blind 10' includes panels of the mesh material 26 that are secured between the flexible frame members 14', 16'. However, the panels differ from the panels 24 of the hunting blind 10, due to a variation in the spacing between the flexible frame members 14', 16' of the frame 12', as compared to the spacing between the frame members 14, 16 of the frame 12. Thus, although the frame 12 of the hunting blind 10 is a fixed frame including interconnected extruded members 14, 16, the frame 12 of the hunting blind is not limited to a fixed frame and may include a pop-up frame 12' with foldable frame members 14', 16'. In an example embodiment, the pop-up frame includes panels of the mesh material 26 secured between the foldable frame members 14', 16' such that when the frame 12' is moved from a folded position to a deployed position, the exterior of the hunting blind 10' is visible through the panels from the interior of the hunting blind yet the interior of the hunting blind 10' is not visible through the panels from the exterior of the hunting blind 10'.

While certain embodiments of the present invention have been shown and described herein, such embodiments are provided by way of example only. Numerous variations, changes and substitutions will occur to those of skill in the art without departing from the invention herein. Accordingly, it is intended that the invention be limited only by the spirit and scope of the appended claims.

What is claimed is:

1. A camouflage structure comprising:
   a pop-up frame including a plurality of flexible frame members, said plurality of flexible frame members comprising at least two spaced apart frame members;
   a plurality of panels of a mesh material defining an outer surface of the camouflage structure and attached to the flexible frame members covering an area between the spaced apart frame members and defining an interior of the camouflage structure; and
   one or more panels of non-mesh material provided along a roof of the camouflage structure and attached to the flexible frame members;
   wherein the mesh material is interwoven fabric with a camouflage pattern printed on a first side, and a second side with a dark color coating, said second side opposite to the first side;
   and wherein the mesh material is partially transmissive and has an aperture density that corresponds to an airflow between 30% and 40%, wherein the airflow is defined as a ratio of a velocity of outgoing air from the mesh material to a velocity of incident air onto the mesh material.

2. The camouflage structure of claim 1, comprising a front side and a back side each formed by the frame members and panels of the mesh material secured between the frame members, wherein a door is formed in one of the back side and the front side.

3. The camouflage structure of claim 1, wherein the mesh material is partially transmissive such that a portion of incident radiation from an exterior of the camouflage structure is reflected off the camouflage pattern back into the exterior, a portion of incident radiation from an interior of the camouflage structure is transmitted through the mesh material to the exterior and wherein a ratio of an intensity of the reflected portion to an intensity of the transmitted portion is above a threshold value such that an exterior of the camouflage structure is visible through the camouflage material from the interior of the camouflage structure and the interior of the camouflage structure is not visible through the mesh material from the exterior of the camouflage structure.

4. The camouflage structure of claim 1, wherein the frame members have a variation in the spacing between the spaced apart frame members.

5. The camouflage structure of claim 1, wherein the frame includes a pair of sides, a front side and a back side, and wherein the frame includes the frame members and wherein panels of the mesh material are secured between the frame members to form at least one window in one or more of the pair of sides, the front side and the back side.

6. The camouflage structure of claim 1, wherein said panels of mesh material comprise;
   a first panel attached to the spaced apart frame members to cover a first area between the spaced apart frame members, and
   a second panel attached to the spaced apart frame members to cover a second area between the spaced apart frame members,
   and wherein the first panel and the second panel are one of;
      positioned such that the second panel is opposite to the first panel on the frame and the second panel is oriented parallel to the first panel, and
      disposed at an angle relative to each other.

7. The camouflage structure of claim 1, wherein the plurality of frame members are configured to form an enclosure that surrounds the interior.

8. The camouflage structure of claim 1,
wherein the panels of mesh material and the panels of non-mesh material cover the area between the spaced apart frame members and define the interior of the camouflage structure.

9. The camouflage structure of claim 8, wherein the panels of non-mesh material are non-transmissive such that incident radiation from an exterior of the camouflage structure is not transmitted through the non-mesh material.

10. The camouflage structure of claim 9, wherein the panels of non-mesh material comprises roof panels and wherein the non-mesh material comprises polystrene.

* * * * *